United States Patent [19]

Payne et al.

[11] Patent Number: 4,910,737
[45] Date of Patent: Mar. 20, 1990

[54] BISTABLE OPTICAL DEVICE COMPRISING A LIGHTLY DOPED OPTICAL FIBRE

[75] Inventors: David N. Payne, Southampton; Robert J. Mears, Havant; Simon B. Poole; Laurence Reekie, both of Hampshire, all of United Kingdom

[73] Assignee: Plessey Overseas Limited, Ilford, United Kingdom

[21] Appl. No.: 195,638

[22] PCT Filed: Sep. 22, 1987

[86] PCT No.: PCT/GB87/00668
§ 371 Date: Jul. 21, 1988
§ 102(e) Date: Jul. 21, 1988

[87] PCT Pub. No.: WO88/02133
PCT Pub. Date: Mar. 24, 1988

[30] Foreign Application Priority Data

Sep. 22, 1986 [GB] United Kingdom ............... 8622745

[51] Int. Cl.⁴ .............................................. H01S 3/30
[52] U.S. Cl. ............................................ 372/6; 372/71; 372/93; 372/108; 350/96.15
[58] Field of Search ................... 372/6, 69, 70, 71, 73, 372/93, 94, 108, 101, 98; 350/96.15, 96.18, 96.29, 96.34

[56] References Cited

U.S. PATENT DOCUMENTS

| | | | |
|---|---|---|---|
| 3,440,562 | 4/1969 | Koester | 331/94.5 |
| 3,599,106 | 8/1971 | Snitzer | 372/6 |
| 3,610,731 | 10/1971 | Seidel | 350/160 |
| 3,729,690 | 4/1973 | Snitzer | 331/94.5 |
| 4,015,217 | 3/1977 | Snitzer | 372/6 |
| 4,039,851 | 8/1977 | Jain et al. | 372/6 |
| 4,044,315 | 8/1977 | Snitzer | 372/6 |
| 4,063,106 | 12/1977 | Ashkin et al. | 372/6 |
| 4,780,877 | 10/1988 | Snitzer | 372/6 |

FOREIGN PATENT DOCUMENTS

| | | | |
|---|---|---|---|
| 0175477 | 9/1985 | Japan | 372/6 |
| 1112420 | 5/1968 | United Kingdom. | |
| 2180392 | 3/1987 | United Kingdom. | |

OTHER PUBLICATIONS

Daino et al; "New All-Optical ... Birefringent Fibers"; Optics Letters, vol. 11, No. 1; 01/1986; pp. 42–44.
Jauncey et al; "Efficient Diode-Pumped ... Fibre Laser"; Electronics Letters, vol. 22, No. 4; 01/13/1986; pp. 198–199.
Mears et al; "Rare-Earth-Doped Fiber Lasers"; Technical Digest of the Optical Fiber Communication Conference, 24–26; 02/1986; Atlanta, U.S.A., IEEE; pp. 62–64; Tul 15.
IEEE J. Quantum Electron, 1982, QE-18 pp. 1351–1361, C. Harder et al., "Bistability and Pulsations in Semiconductor Lasers with Inhomogenous Current Injection".
Electronics Letters, vol. 21, No. 17, pp. 737–738, 1985, Poole, S. B. et al., "Fabrication of Low Loss Optical-Fibres Containing Rare Earth Ions".
Electronics Letters, vol. 21, No. 17, pp. 738–740, 1985, Mears, R. J. et al., "Neodymium-Doped Silica Single-Mode Fibre Lasers".

Primary Examiner—Frank Gonzalez
Attorney, Agent, or Firm—Fleit, Jacobson, Cohn, Price, Holman & Stern

[57] ABSTRACT

A fibre laser (1) of the type comprising a doped single-mode optical fibre (3) arranged between reflectors (5,7), and which is coupled (11) to an optical pumping source (9). For the given reflection efficiency of the reflectors (5,7), the length of the optical fibre (3) is chosen such that it exceeds that affording saturation and provides at its end a region for absorption (FIG. 1). The resultant hysteretic behavior of this bistable device may be utilized for logic memory (bistable), and regenerative amplification applications. To this end a second source (9') can be coupled (11',19) to the laser fibre (3).

8 Claims, 4 Drawing Sheets

BISTABLE OPTICAL DEVICE COMPRISING A LIGHTLY DOPED OPTICAL FIBRE

TECHNICAL FIELD

The present invention concernes bistable optical devices, more particularly those useful for optical communications systems and the like.

Devices are sought which can be interfaced with and incorporated in optical fibre systems. These then would have potential applications to switching, memory and regenerative amplifier components and systems.

BACKGROUND ART

Optical bistability (the existence of two distinct, stable output states corresponding to a single input state) has been demonstrated using several techniques e.g. nonlinear dispersion, self-focussing and saturable absorption ("Optical Bistability", C. M. Bowden, M. Ciftan and H. R. Robl, Plenum 1981). To obtain optical bistability, the output of the optical device must be a nonlinear function of some input parameter and sufficient degree of feedback should be incorporated. High light intensities are required in order to achieve the necessary nonlinear behaviour.

Nonlinear absorption in a saturable absorber has been demonstrated as a technique for achieving bistable behaviour in e.g. semiconductor-type lasers—see for example "Bistablility and pulsations in semiconductor lasers with inhomogeneous current injection", C. Harder et al, IEEE J. Quantum Electron, 1982, QE-18 pp

DISCLOSURE OF THE INVENTION

The present invention is intended to provide a bistable optical device that is fully compatible with conventional optical fibres and integrated optics devices, and which can be readily jointed to these components.

In accordance with the invention thus there is provided a bistable optical device comprising:

an optical cavity laser having input and output reflecting means, one at each end thereof; and, a pumping source, optically coupled to the input end of the cavity laser, to inject pumping radiation therein; wherein, the cavity includes a length of doped single-mode optical fibre, the dopant thus being of rare-earth or transition metal ions which ions exhibit a three-level lasing transition; and, the output coupling provided by the output reflecting means and the length of this fibre, both being provided such that there is a region of saturable absorption at the output end of the fibre.

A technique has now been developed for incorporating significant quanties of rare-earth and other dopants into the core or cladding of an optical fibre (S. B. Poole, D. N. Payne and M. E. Fermann, Electronics Letters, 21, pp. 737-738, 1985). Using this fibre, it has been possible to fabricate a new type of laser, the single-mode fibre laser (R. J. Mears, L. Reekie, S. B. Poole and D. N. Payne, Electronics Letters, 21, pp. 738-740, 1985). These lasers have a number of advantages over their bulk glass counterparts, namely no auxiliary cooling requirement, ultra-low lasing threshold and the ability to operate in a CW mode. Notably, it is possible to achieve CW operation with 3-level lasers, which have traditionally been operated only in a pulsed mode due to the required cooling and threshold requirements.

In order to obtain lasing in a 3-level laser, it is necessary to bleach (i.e. saturate) the absorption of the doped glass at the lasing wavelength. By virtue of the small core radius of single-mode optical fibre ($\simeq 5$ $\mu$m), saturation is easily achieved for pump powers of only a few mW at any point in the fibre. By appropriate choice of fibre length and output coupling, it is possible to obtain a region of saturable absorption in a 3-level single-mode fibre laser.

The device aforesaid is advantageous in that it is fully compatible with conventional optical fibres and integrated optics devices and can be readily jointed to these components. Such a device can also be used in conjunction with other fibre optic and integrated optic devices such as, for example, directional coupler, polarisers, exposed field devices and modulators.

Whilst it is convenient to employ optical mirrors as the reflecting means, end face polishing or distributed feedback reflection grating implimentation are not precluded from the general scope of this invention. Coupling means for the pumping source may be either external to or incorporated within the cavity itself.

The dopant ions can be of erbium, for example. Other 3-level lasing transition ions, however, e.g. neodymium, praseodymium, or chromium, also, would be suitable.

BRIEF INTRODUCTION OF THE DRAWINGS

In the drawings accompanying the specification:

Figure 5:
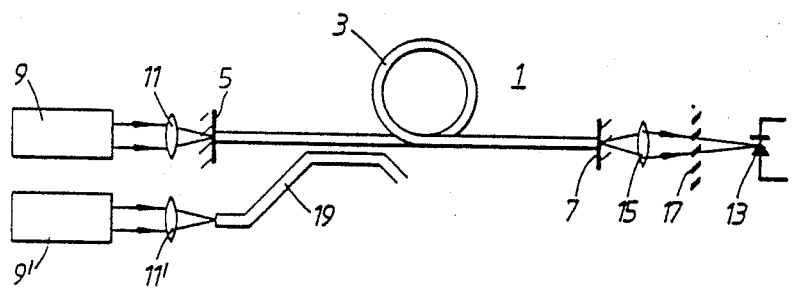
FIG. 5 shows an experimental configuration similar to that of FIG. 1 above, when modified to utilise optical input signals combined from a pair of optical sources.
Figure 6:
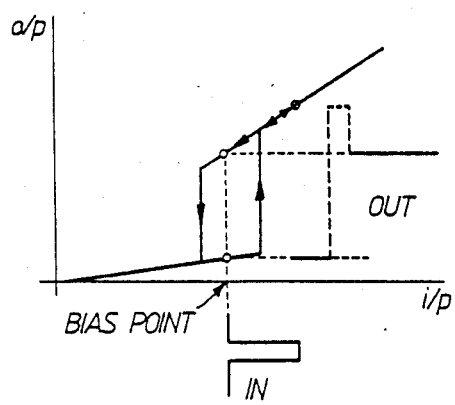
Figure 7:
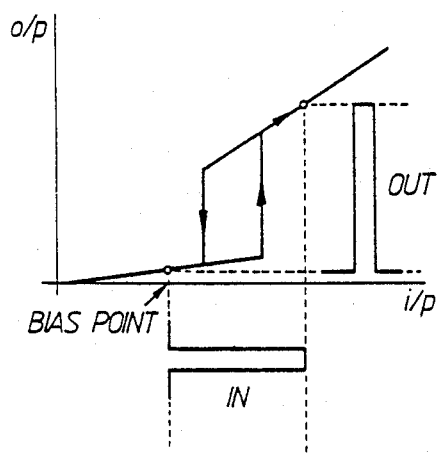

FIGS. 6 and 7 illustrate typical device characteristics for the device of the preceding Figure, together with input and output response waveforms when the device is optically biased to perform the functions of an optical memory and of a regenerative amplifier, respectively; and, FIGS. 8($a$) and 8($b$) show respectively input signals and output response waveforms for a bistable switch arrangement, together with device characteristics to illustrate operation of the device of FIG. 5 when operated in this mode of application.

DESCRIPTION OF AN EMBODIMENT

So that this invention may be better understood, an embodiment thereof will now be described and reference will be made to the drawings. The description that follows is given by way of example only.

Figure 1:
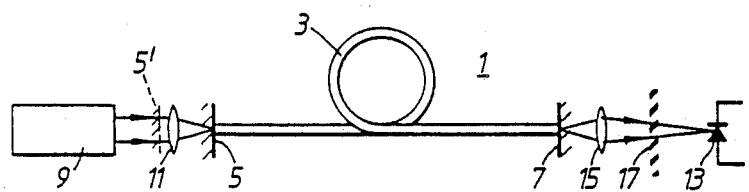
FIG. 1 shows an experimental configuration used to demonstrate bistability in accord with this invention.

A typical arrangement of the laser and source is shown in FIG. 1. The cavity 1 of this laser comprises a coiled length of active-ion doped single-mode silica fibre 3 the ends of which have been abutted to optical flat highly-reflecting mirrors 5 and 7. This is axially pumped by means of a pumping optical source 9 which in the illustration is optically coupled to the cavity 1 by means of a lens objective 11 external to the cavity 1. In this experimental arrangement, laser radiation is focussed onto a detector diode 13 by a second lens 15 and passes via a filter 17.

The fibre 3 shown has been doped with trivalent erbium ions ($Er^{3+}$). However it should be noted that other three level lasing transitions using rare-earth or transistion metal dopants for example neodymium, praseodymium, or chromium could be used. The length of fibre 3 used was approximately three meters, though in general this choice would be dependent on the mirror reflectivities and the cavity configuration adopted. The input mirror, FIG. 1, had a transmission of 60% at the pump wavelength of 514.5 nm and a reflection of 80% at the lasing wavelength of 1.54 microns.

The output mirror was somewhat similar, providing an output coupling of 20% at the lasing wavelength.

An $Ar^+$ ion laser operating at 514.5 nm was used as the pump source. The erbium doped fibre used exhibited an absorption of 10 db/m at the pump wavelength of 514.5 nm corresponding to a dopant concentration of approximately $10^{19}$ ions/cm$^3$.

Figure 2:
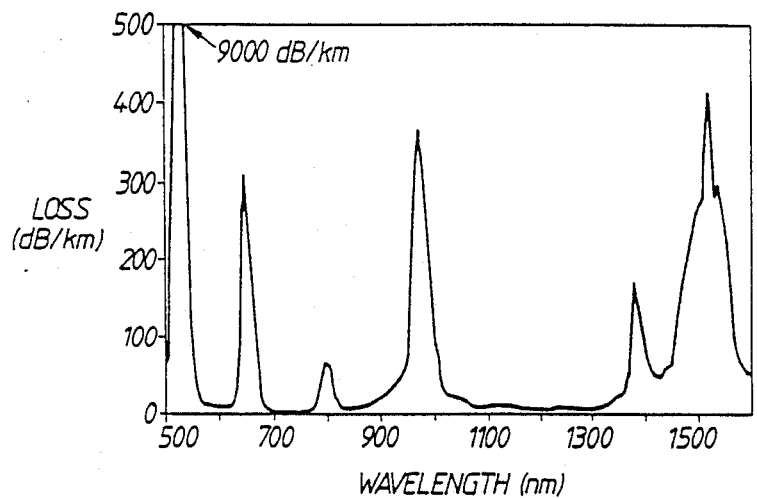
FIG. 2 shows the absorption spectrum of a typical erbium-doped single-mode optical fibre.

Other types of laser could be substituted, and it is noted that a dye laser operating at 650 nm has also been demonstrated as a suitable pump source (FIG. 2).

The fibre 3 could be cleaved at both ends and butted to dielectric mirrors 5 and 7, (as described above and shown in FIG. 1), or the microscope objective 11 could be placed within the laser cavity 1 in order to couple light into the fibre. This would be preferred for high level pumping radiation and would obviate mirror damage due to focussing effects (see here for alternative position 5' of mirror 5).

Figure 3:
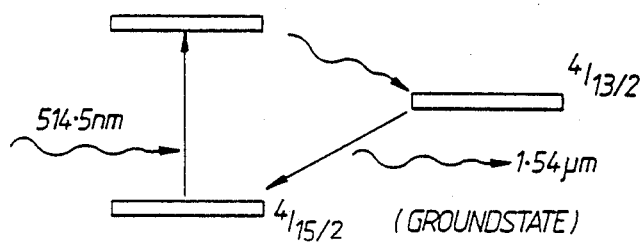
FIG. 3 shows the energy level diagram for the three-level lasing transition in erbium.
Figure 4:
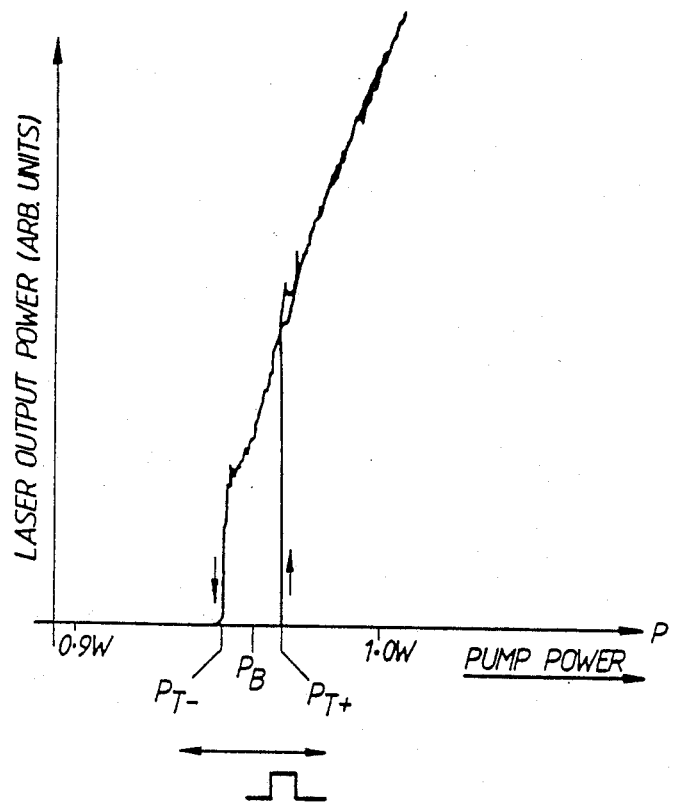
FIG. 4 shows lasing characteristics obtained from such a device as in FIG. 1 above showing hysteresis in the output of the laser.

Using this latter configuration with a short (approximately 1 m) length of $Er^+$ doped fibre 3, a normal linear lasing characteristic is obtained on the three-level $^4I_{13/2}$-$^4I_{15/2}$ transition at 1.54 μm (FIG. 3). For this length of the fibre 3, saturation is achieved throughout the length of the fibre before laser threshold is reached, thus ensuring a linear lasing characteristic. If, however, the longer length of three meters of fibre, is used, bleaching of the laser level at 1.54 μm is not achieved at the output end of the fibre. It therefore becomes necessary to increase the pump power P above that previously required to reach threshold, to a point at which a rapid turn-on of the laser 1 is observed. Further increase of the pump power yields a normal laser characteristic. If, however, the pump power P is reduced below that power $P_{T+}$ required to switch on the fibre laser 1, switch-off does not immediately occur (see power level $P_{T-}$), and a region is found below the turn-on threshold $P_{T+}$ over which saturation is still achieved and lasing occurs. This gives rise to hysteresis in the output of the laser 1, with the possibility of switching and memory effects (FIG. 4). Both of these effects have been demonstrated using this device. For example, by biasing the laser 1 within the hysteresis loop (see $P_B$) and applying an optical pulse at 514.5 nm, it is possible to switch the laser to the upper state, thus demonstrating optical memory effect.

TECHNICAL APPLICATION

Devices such as described above have a number of useful applications. Thus for example:

(i) They can be used in conjunction with rare-earth doped optical fibre lasers as monolithic optically addressable light sources;

(ii) They can be used to provide remote optical switching of signals in optical fibres for the purposes of multiplexing/demultiplexing;

(iii) They can be configured as optical memories and hence optical logic gates providing binary digital logic functions for use in optical and hybrid optoelectronic computers;

(iv) They may be used for multichannel parallel optical data processing such as ultrafast matrix multiplication and inversion;

(v) Optical limiting functions may be provided by operation of the device under the proper bias and feedback conditions, and, (vi) The device may be used as a regenerative amplifier or optical fibre telecommunications link.

Some of these applications will now be considered in more detail and reference will be made to accompanying FIGS. 5 to 8. As shown in FIG. 5 the configuration has been modified by the addition of means for injecting further optical power at the pumping frequency. This comprises a second power source 9' and focussing leas 11', co-operative with means 19 for coupling optical power into the assembly. This can be in the form of a fibre coupler 19 and for convenience, this is incorporated within the optical cavity of the bistable laser 1 where it has been spliced to the doped fibre 3. Other forms of coupling assembly, within or external to the cavity, however, are not precluded. Thus, for example, split mirrors, prisms or other optical components of conventional type could be used as an alternative manner of construction. It is noted that cavity losses introduced by the coupler 19 can be compensated by using mirrors 5, 7 of a higher reflectivity than aforementioned.

For memory device application, the additional power source 9' is set to provide a CW power level at a bias point lying between the upper and lower hysteresis transition points (FIG. 6). When the signal power provided from the first power source 9 raises the total power level to a level exceeding the upper hysteresis transistion point, this results in a significant increase in the bistable laser output. When the signal power falls to a lower level, the output level remains high and this will continue to be maintained whilst the bias power is applied.

For regenerative amplifier application, the additional power source 9' is set to provide a CW power level at a bias point lying below the lower hysteresis transition point (FIG. 7). When, in the presence of this bias, signal power is applied and the total power exceeds the upper hysteresis transition point, this will result in an increased level regenerated output signal. The advantage of this arrangement is that lower level signals, e.g. noise signals, that do not increase total power level beyond the upper hysteresis point, will accordingly be suppressed.

Figure 8A:
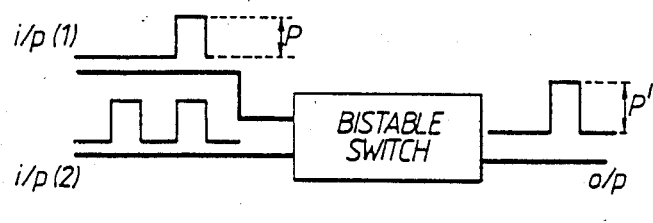
Figure 8B:
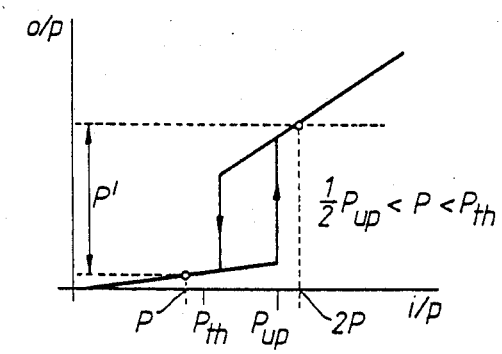

Sources 9 and 9' may both be signals sources and the configuration used as a bistable switch logic device (FIG. 8(a)). For operation in this mode, the signal pulses i/P (1) and i/p (2) have pulse levels P each less than threshold $P_{th}$. Coincident pulses result in a total power level 2P. The pulse level is chosen so that the total power then exceeds the upper hysteresis transition point $P_{up}$. The level is thus set at a value P given by the following inequality relationship:

$$\tfrac{1}{2}P_{up} < P < P_{th}$$

Thus at coincidence the output signal level is raised to a point P' on the upper hysteresis curve corresponding to the total input level of 2P. (FIG. 8(b)).

We claim:

1. A bistable optical device comprising:

An optical cavity bounded by input and output reflecting means located respectively at an input end and an output end thereof, said optical cavity including therein, in series combination, both laser means and saturable absorber means; together with a first pumping source, arranged relative to the input end of the optical cavity to inject pumping radiation therein and to cause said pumping radiation to propagate along said optical cavity from said input end to said output end; also including a second pumping source and optical fiber coupler spliced to an optical fibre and is disposed within said optical cavity cooperative therewith to couple additional optical power into said laser means in which said laser means and said saturable absorber means are constituted by a common single-mode optical fibre, which optical fibre includes an active dopant selected from rare-earth and transition metal ions capable of providing a three-level lasing transition, said optical cavity is tuned to said three-level lasing transition, and said active dopant is active to provide both stimulated emission and saturable absorption corresponding to said transition.

2. A device as claimed in claim 1, wherein said dopant is erbium.

3. A device, as claimed in claim 1, wherein said dopant is one of the elements neodymium, praseodymium or chromium.

4. A device, as claimed in claim 1, wherein said input and output reflecting means each comprise an optical mirror butt-coupled to a respective end of the optical fibre.

5. A device, as claimed in claim 1, wherein the device includes a microscope objective lens located within the cavity of the optical cavity laser means, which lens is arranged to couple the first pumping source to the laser fibre.

6. A device, as claimed in claim 1, wherein one of said first and second pumping sources includes a source of bias power and is set to provide a power level at a bias point lying between the switch-off and turn-on thresholds of the device.

7. A device, as claimed in claim 1, wherein one of said first and second pumping sources includes a source of bias power and is set to provide a power level at a bias point lying below the switch off threshold.

8. A device, as claimed in claim 1, wherein said first and second pumping sources include sources of signal power, each capable of providing pulses corresponding to power levels less than lasing threshold but exceeding one half of the turn-on threshold.

* * * * *